United States Patent
Liu et al.

(10) Patent No.: US 6,263,272 B1
(45) Date of Patent: *Jul. 17, 2001

(54) VEHICLE HAVING A THERMAL PROTECTION ARRANGEMENT FOR TODDLERS AND PETS

(76) Inventors: Christine Liu; Jonathan Liu, both of 20397 Via Napoli, Cupertino, CA (US) 95014

( * ) Notice: Subject to any disclaimer, the term of this patent is extended or adjusted under 35 U.S.C. 154(b) by 0 days.

This patent is subject to a terminal disclaimer.

(21) Appl. No.: 09/440,193

(22) Filed: Nov. 15, 1999

Related U.S. Application Data

(63) Continuation-in-part of application No. 09/416,664, filed on Oct. 12, 1999.

(51) Int. Cl.[7] .............................. B01F 3/02; G05D 23/00
(52) U.S. Cl. .......................... 701/49; 701/36; 236/44 C; 374/132; 324/158.1
(58) Field of Search ................................ 701/49, 53, 36, 701/65; 236/44 C; 374/132; 324/158.1

(56) References Cited

U.S. PATENT DOCUMENTS 6,138,068 * 10/2000 Liu ........................................ 701/49

* cited by examiner

Primary Examiner—William A. Cuchlinski, Jr.
Assistant Examiner—Olga Hernandez

(57) ABSTRACT

The present invention includes a temperature-dependent power window and sunroof system for an automotive vehicle. This system according to the present invention is activated when the vehicle is presumably parked and left unattended by a vehicle operator. One aspect of the invention is directed to the detection of actions by the vehicle operator as input for system activation and deactivation, for example, the operator removes the ignition key, opens the driver door, closes the driver door and locks the door. Advantageously, if the vehicle operator stays in the vehicle after the key is removed from the ignition cylinder, the present invention remains inactivated whereby affording the maximum flexibility to the car driver. One preferred embodiment maintains a "comfortable" temperature range for the interior of the vehicle over the time period the vehicle is parked and left unattended. Moreover, to actively maintain the "comfortable" temperature range for the vehicle interior, a separate algorithm may be used. Another aspect of the invention includes means of communications to alert the vehicle operator and others in case of exceedingly high or low temperatures in the vehicle interior that might be life-threatening to those toddlers, pets or other incapacitated living beings who are left unattended in the vehicle.

20 Claims, 3 Drawing Sheets

VEHICLE HAVING A THERMAL PROTECTION ARRANGEMENT FOR TODDLERS AND PETS

CROSS-REFERENCE TO RELATED APPLICATION

This application is a continuation-in-part (CIP) application of the co-pending U.S. patent application Ser. No. 09/416,664 filed Oct. 12, 1999 on the behalf of Jonathan Liu, entitled "VEHICLE FOR AUTOMATICALLY ADJUSTING WINDOW AND SUNROOF POSITIONS AFTER IT BEING LEFT UNATTENDED BY ITS OPERATOR".

FIELD OF THE INVENTION

This invention has to do in general with a system controlling power window and sunroof of a vehicle for protecting toddlers, pets and other incapacitated living beings from ill effects of high and low temperatures. An aspect of the invention relates to the lowering and raising of a power window and opening and closing of a sunroof both to pre-defined positions to prevent the vehicle interior to become too hot or too cold. In addition, this invention is related to an emergency arrangement for alerting the vehicle driver in case of thermal danger to the well being of those left unattended in the vehicle. Advantageously, this invention also lengthens the operational life span of electronic and mechanical components near or in the vehicle interior.

BACKGROUND INFORMATION

Unless constantly protected by overhead garages, an automotive vehicle, when parked and with its windows and sunroof closed, is often subjected to the risk of overheating its interior. This overheating risk is particularly elevated in summers and in low-latitude regions of the world. For example, in a typical California summer day, the temperature of the interior of a car that has its windows and sunroof closed and parked under the direct sun may easily exceed 40° C. In regions close to the Equator, interiors of cars sometimes are recorded to exceed 60° C. under similar circumstances. Similarly, interiors of unattended cars may be too cold for comfort for people in early mornings when the windows and/or sunroofs were left opened for heat ventilation the day before. Again, this is a fairly usual circumstance for car owners in a typical California summer day that may reach 30° C. during the day and may drop to 10° C. at night.

For the electronic and mechanical components in or near the interior of a car, such high and low temperatures will reduce their operational life span. Also, excessively high and low temperatures in the interior of the car would clearly cause a discomforting or rather, a painful experience for the driver and passengers who are in the car or who subsequently seat themselves in it. This experience is keenly amplified for young children, elderly and those who are physically weak because of their reduced tolerance to discomfort. The discomfort and pain are especially unbearable for bare hands and legs that make contact with the metallic, vinyl, plastic and leather parts of the car interior. When temperatures become excessively hot or cold for even a short duration, lives of toddlers and pets often are lost either due to hyperthermia or hypothermia. Although it is illegal in many areas to leave toddlers, young children, pets and even otherwise incapacitated living beings unattended in the car, people still do. Furthermore, such legal protection, even if in existence, does not extend worldwide and therefore, it is desirable to have a system for alerting others when such danger exists.

One common solution to prevent overheating the interior is to roll down the car windows before leaving the car. For security reasons, the windows are typically lowered to a position so that air ventilation may be effective in lowering the interior temperatures but not too low a position so that burglars may easily gain access to the car. For some cars, alarm is provided to detect any irregular car access attempts. For hand-cranked window systems, a car driver typically removes the key from the ignition cylinder, cranks the window down to a satisfactory position and then leaves the car. For power window systems, they are usually advantageous over any hand-cranked systems in the areas of effort, speed and convenience. However, these window systems typically are not operable unless an ignition key cylinder is turned to ACCESSARY or ON position by an ignition key. Therefore, for such systems, the car driver has to make adjustment to the window position before turning the ignition key cylinder to OFF position and before removing the key from the ignition cylinder.

Other power window systems allow the car driver to remove the key from the ignition key cylinder first, and then regardless of the vehicle interior temperature, they immediately and automatically raise or lower car windows to desired positions for the purpose of preventing the overheating of the car interior. Unfortunately, these systems remove the flexibility desired by the car driver by assuming that the driver is leaving the car once the ignition key is removed. Even in the case that the driver does leave, moving the car windows to a fixed position regardless of vehicle interior temperature may harm toddlers and pets the driver leaves unattended. As an improvement, another system provides a sensor in the vehicle to detect presence of living beings. However, such sensor simply detects presence of living beings, but it does not attempt to distinguish the car driver from others who may be potentially incapacitated living beings. Advantageously, one embodiment of the present invention does attempt to make that distinction. That is, if the car driver is present in the car after the key is removed from the ignition cylinder, the present invention remains inactivated whereby affording the maximum flexibility to the car driver.

Although these existing systems do address the above-stated problems, they however, are partial solutions. First of all, they do not take into account the variability of temperature in the car interior as the car is parked over a time period. For example, a car driver drives to work in the morning. The chilly morning makes his car interior cold. At the time of leaving the car, to prevent the ill effects of the coldness on electronic and mechanical components, the driver should not lower the windows and should not open the sunroof for ventilation. However, as the sun rises, it heats up the car interior and now the windows should be lowered and the sunroof should be opened appropriately to prevent overheating the car interior. In the late afternoon, tree shades over the parked car allow the car interior to have comfortable temperatures and the windows and the sunroof should then be closed for security reasons. However, it may also be preferred that the windows and the sunroof are not closed until the vehicle interior temperature has dropped below a temperature threshold. Moreover, when comfortable temperatures do exist in the vehicle interior, an alternative control algorithm may be used to better maintain those comfortable temperatures.

Secondly, in extremely hot and cold days, it is possible that such temperature-dependent window and sunroof system does not prevent the temperature of the vehicle interior from rising or dropping into life danger zones. It is in those zones where the temperatures of the vehicle interior are likely to cause fatalities especially for those who are physically incapacitated. Therefore, it is desirable to have a communications system for alerting the vehicle driver or others when the danger of fatalities comes about.

These desired automatic window and sunroof adjustments occurring while the driver is away are not provided by any existing and prior art. Therefore, it is desirable to have a power window and sunroof system for automotive vehicles. This system is operative while the vehicle is left unattended. It intelligently controls the window and sunroof positions of the vehicle for ventilation to prevent the vehicle interior to become too hot or too cold. It further alerts the vehicle driver or others when life-threatening temperatures exist in the vehicle interior.

SUMMARY OF THE INVENTION

Briefly, a method and apparatus is provided for automatically adjusting a vehicle's window and sunroof positions after the vehicle is parked and the vehicle operator left it unattended. The present invention includes a power window and sunroof system for an automotive vehicle. This system according to the present invention is activated when the vehicle is presumably parked and left unattended by a vehicle operator. One set of technical indications for such circumstance includes an ignition switch OFF/key removed signal, a subsequent driver door OPENED and CLOSED signals. Other preferred embodiments may further include a door LOCKED signal. One aspect of the invention is directed to the detection of actions by the vehicle operator as input for system activation and de-activation, for example, the operator removes the ignition key, opens the driver door, closes the driver door and locks the door. Advantageously, if the vehicle operator stays in the vehicle after the key is removed from the ignition cylinder, the present invention remains inactivated whereby affording the maximum flexibility to the car driver.

Once activated, the power window and sunroof system will be disabled automatically when the vehicle operator returns to drive the vehicle away. In that case, a set of technical indications includes a driver door OPENED signal, a driver door CLOSED signal and a subsequent ignition switch ON signal. Also, one feature of the present invention allows the vehicle operator to manually inactivate the system.

The present invention also has a temperature sensing circuitry to be appropriately located somewhere in or near the interior of the vehicle. Once the system is activated by the set of technical indications, output of the temperature sensing circuitry would then be used to control the window and sunroof positions of the vehicle for ventilation to prevent the vehicle interior to become too hot or too cold. One preferred embodiment maintains a "comfortable" temperature range for the interior of the vehicle over the time period the vehicle is parked and left unattended. It is therefore reasonable to desire having the "comfortable" temperature range maintained for as long as possible. In this embodiment, the windows and the sunroof are moved to the CLOSED positions if the interior temperature drops below the low side of the range, and they are moved pre-defined OPENED positions if the interior temperature exceeds the high side of the range. If the temperature falls within the range, then they may be optionally be moved to either the OPENED or CLOSED positions depending on manufacturing preference. Moreover, to actively maintain the "comfortable" temperature range for the vehicle interior, a separate algorithm may be used for controlling the window and sunroof positions to better maintain those comfortable temperatures.

One aspect of the present invention includes a control panel in the vehicle interior for the operator setting of the temperature range, the window and sunroof ventilation positions.

Another aspect of the invention includes means of communications to alert the vehicle operator and others in case of exceedingly high or low temperatures in the vehicle interior that might be life-threatening to those toddlers, pets or other incapacitated living beings who are left unattended in the vehicle.

BRIEF DESCRIPTION OF THE DRAWINGS

A better understanding of the present invention can be obtained by considering the following detailed description taken together with the accompanying drawings that illustrate preferred embodiments of the present invention in which.

DETAILED DESCRIPTION OF THE PREFERRED EMBODIMENTS

With today's advances in technology, the design of specialized integrated circuits and programmable logic generally do not require the rendering of fully detailed circuit diagrams. The definition of logic functionality allows computer design techniques to design the desired logic and circuits. Additionally, vehicle micro-controllers are known to operate based on a desired flow chart diagram rendered into software. Accordingly, portions of the present invention will be described primarily in terms of functionality to be implemented by a vehicle micro-controller and other associated electronic components. This functionality will be described in detail with the associated flow chart diagram. Those of ordinary skill in the art, once given the following descriptions of the various functions to be carried out by the present invention will be able to implement the necessary micro-controller structure and logic for various logic devices or custom designed integrated circuits in suitable technologies without undue experimentation.

Figure 1:
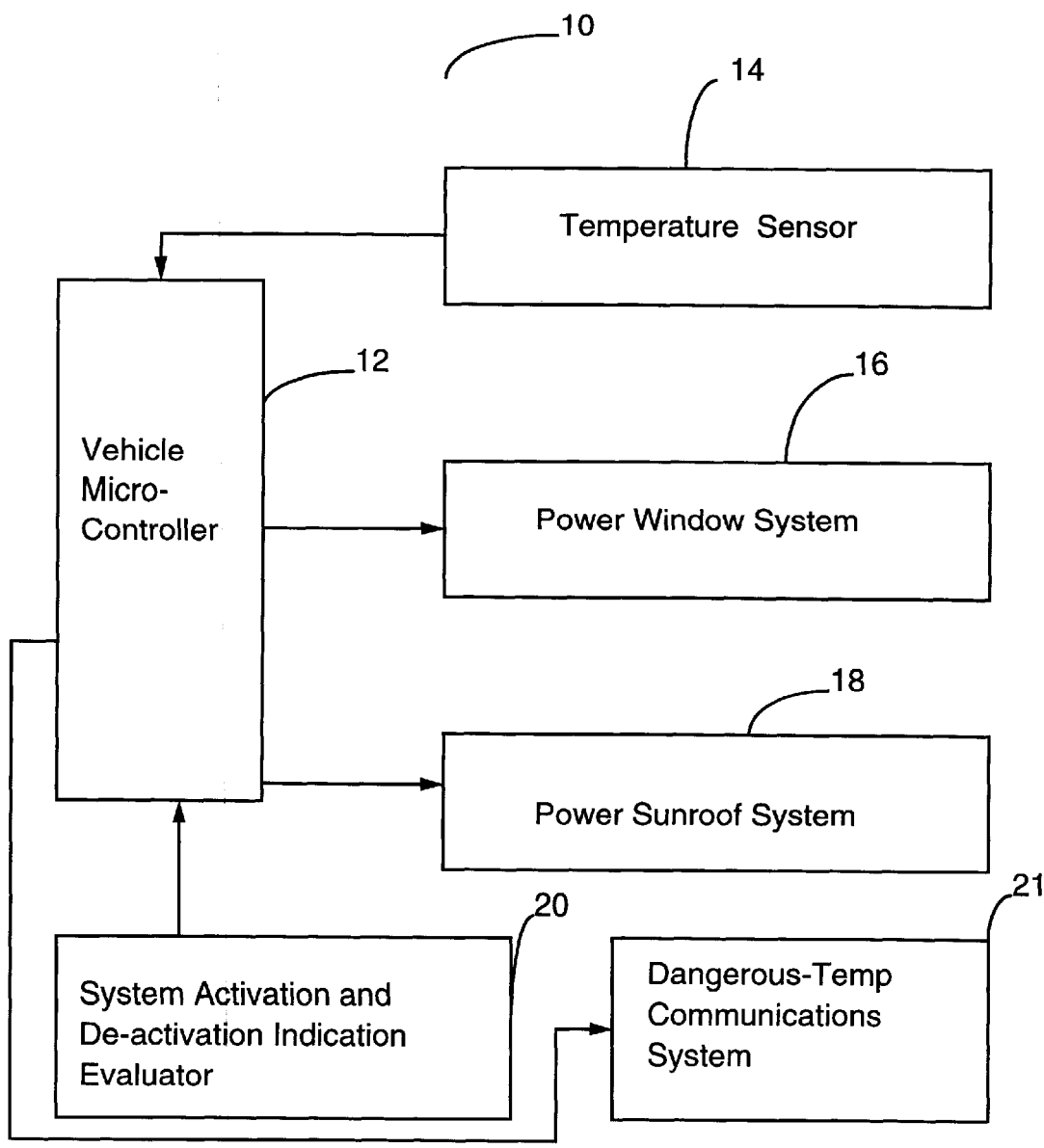
FIG. 1 shows a simplified functional diagram including a vehicle micro-controller in accordance with the present invention.

Automatic power window and power sunroof systems are commonplace in automotive vehicles today and the mechanisms for enabling such systems are also well known. However, these systems are typically operative only when the ignition key for a vehicle is inserted and hand-turned in the ignition cylinder to either the ACCESSARY, ON or START position. FIG. 1 in accordance with the present invention shows a simplified functional diagram 10 illustrating a vehicle micro-controller 12. Once the present invention is activated by a set of technical indications as required by an activation evaluator 20, this micro-controller 12 receives temperature information of a vehicle interior from a temperature sensor 14. Subsequently, the micro-controller 12 sends appropriate commands to a power window system 16 and/or a power sunroof system 18 in response to the received temperature information. However, after the system is de-activated by another set of technical indications as evaluated by the deactivation evaluator 20, the micro-controller 12 ceases to access the temperature sensor 14 for the temperature information of the vehicle interior. If the temperature sensor 14 indicates a life-threatening condition to living beings, for example, temperatures over 35° C. or below 10° C., then a dangerous-temperature communications system 21 is activated to alert the vehicle driver or others about the dangerous condition. Preferably for the present invention, the set of technical indications required for activation and de-activation are directed to detect direct actions by the vehicle operator. In this manner, the micro-controller 12 would have then be able to rule out the vehicle operator as one of the potential incapacitated living beings. In other words, the present invention should not be activated and the control over the vents should continue to be afforded to the vehicle driver if the driver remains inside the vehicle after the key removal from the ignition cylinder. The power mechanisms for the power window system 16 and the sunroof system 18 are typical and well known, and engineers in the arts may readily design an interface for use between the systems 16,18 and the vehicle micro-controller 12 of the present invention without undue experimentation.

Figure 2:
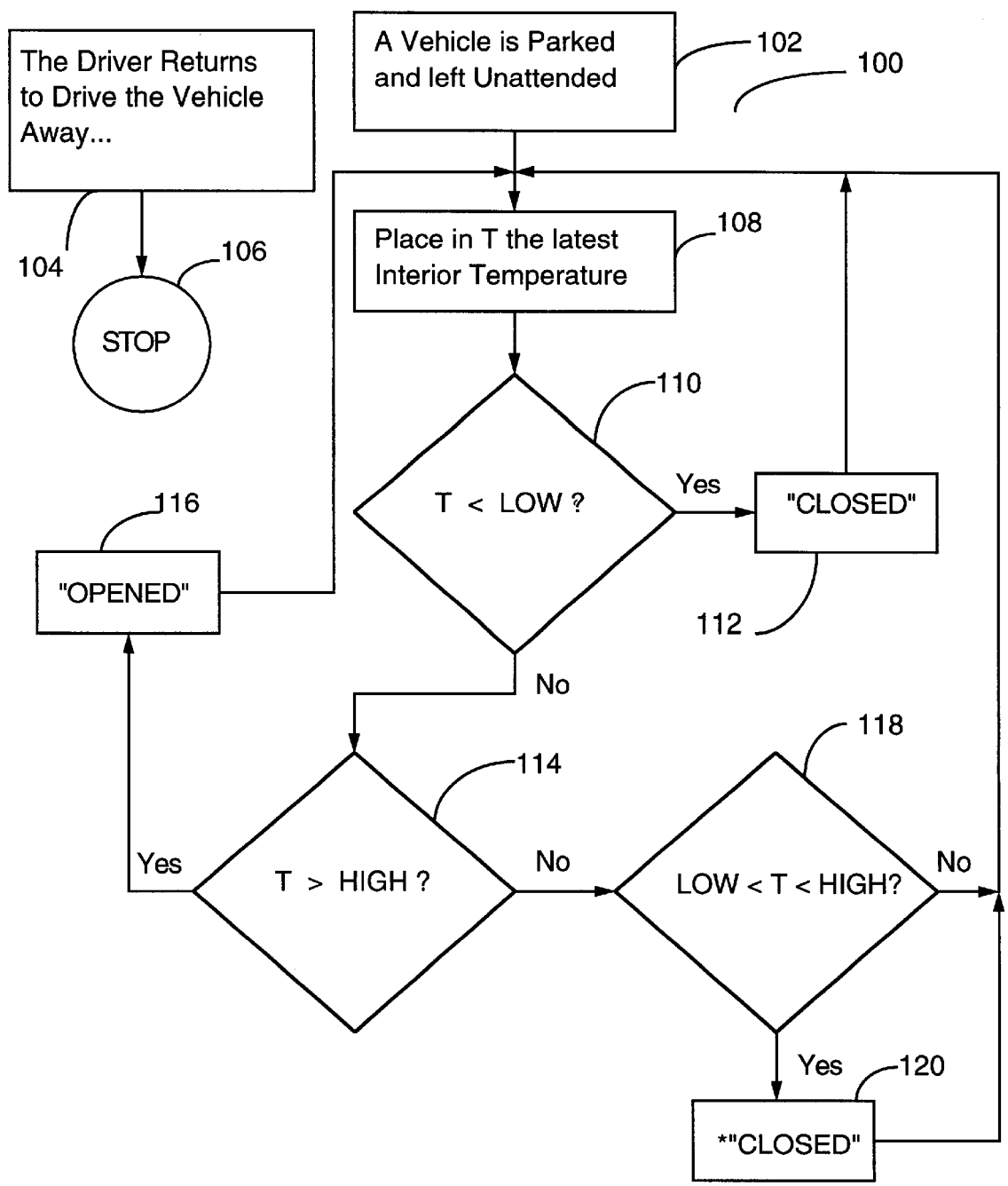
FIG. 2 illustrates a general operating flowchart for a control routine of a preferred embodiment for controlling power window and sunroof positions of an automotive vehicle after the vehicle is parked and the vehicle operator left it unattended.

Now, referring to FIG. 2 in conjunction with FIG. 1, FIG. 2 shows a general operating flowchart for a control routine 100 of a preferred embodiment for controlling power window and sunroof positions of a vehicle after the vehicle is parked and the vehicle operator left it unattended. Since the power mechanisms for the windows and the sunroof are typically implemented independent and separate from each other, therefore, the flowchart in FIG. 2 could be applicable to a power window system, a power sunroof system, another vehicle vent system or multiple systems in combination.

The present invention per the control routine 100 in FIG. 2 is activated in step 102 when the vehicle is parked and left unattended by a vehicle operator. For implementations, different sets of indicators may be used to presume such circumstance. In one preferred embodiment, the indicators required for the activation evaluator 20 for may include an ignition switch OFF and an ignition key removed signal. In addition to these signals, other preferred embodiments may use a driver door OPENED signal and a subsequent driver door CLOSED signal to better indicate to the present invention that the vehicle operator has parked and subsequently left the vehicle. Yet another embodiment may require a door LOCKED signal before the present invention is activated in step 102 by the activation evaluator 20. The occurrence sequence of these signal may vary, for example, a driver door OPENED signal may occur either before or after the key removal signal; however, the door LOCKED signal has to occur after the driver door OPENED and CLOSED signals. These signals are known and typical to a modern vehicle, and the electronics for activating the present invention requires no more than several discrete logic gates; however, in practice, it may also be implemented in hardware or firmware in the vehicle micro-controller system 12. As an example, this control routine 100 may be operating as a part of the vehicle's overall control system and under the control of the vehicle's micro-controller system 12. In that case, the activation step 102 may be initiated either by polling or via the interrupt method as directed by the vehicle micro-controller 12.

The present invention is deactivated in steps 104,106 when the vehicle operator returns and drives the vehicle away. Again, for implementations, different sets of indicators may be used to presume such circumstance. In one preferred embodiment, the indicators required for the de-activation evaluator 20 may include a driver door OPENED signal, a driver door CLOSED signal and a subsequent ignition switch ON signal. Although the occurrence sequence may again vary, regardless, these signals in combination presumes the return of the vehicle operator, the operator's inserting the ignition key into the ignition cylinder and the operator's turning the ignition cylinder to ON position to drive the vehicle away. In other embodiments, these signals may be required to occur within a predetermined time duration, for example, all three signals must occur within an one-minute duration. Again, the deactivation steps 104,106 to be executed in the de-activation evaluator 20 may be implemented via polling or interrupt methodologies. If the control routine 100 is a part of a larger program, then step 106 would cause the control to be transferred back to its (100's) calling function. Furthermore, a manual switch may be provided for the vehicle operator to bypass the present invention, in other words, the manual switch is able to prevent the present invention to be activated when the vehicle is parked and left unattended by the vehicle operator.

The present invention also has a temperature sensing circuitry 14 to be appropriately located somewhere in or near the interior of the vehicle. Once the system is activated by a set of technical indications, output of the temperature sensing circuitry 14 would then be used to control the window and sunroof positions of the vehicle for ventilation to prevent the vehicle interior to become too hot or too cold. For example, once the present invention is activated, step 108 of FIG. 2 indicates that temperature readings generated by the temperature sensing circuitry 14 are accessed and saved into a register T by the vehicle micro-controller 12.

Figure 3:
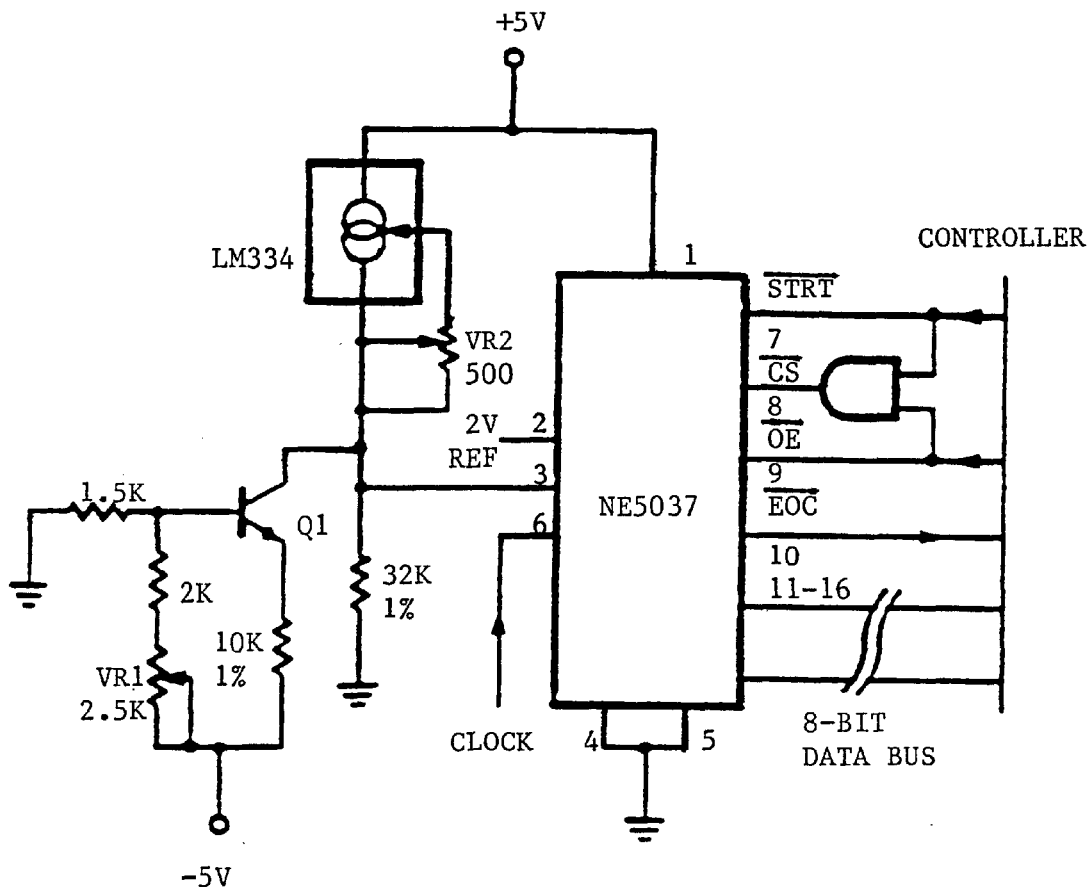
FIG. 3 illustrates a typical temperature sensor suitable for use in a preferred embodiment in accordance with the present invention.

Numerous temperature-sensing circuits are available for use as the temperature sensor 14 operative in connection with the micro-controller 12. FIG. 3 illustrates such a typical temperature sensor 200 suitable for use in the present invention. Briefly, LM334 is a three-terminal temperature sensor and provides a current of 1 microamp for each degree Celsius. The 32 Kohm resistor below the LM334 generates 32 mV for each microamp going through it, and that generated voltage is fed into an analog to digital temperature converter, NE5037. NE5037 converts the analog temperature information into the digital format manageable by the vehicle micro-controller 12 (shown in FIG. 1). In order to read temperature, the micro-controller 12 may initiate the conversion process in NE5037 by sending a momentary low signal to pin 7 of the NE5037. When pin 10 of the NE5037 becomes low, conversion is complete and a low is then applied to pin 9 of the NE5037 to read data on pins 11 and through 16. This temperature sensor 200 is arranged to read temperatures ranging from 0° to 63° Celsius; it 200 can be readily re-arranged to detect a different range of sixty-four degrees. We can also replace NE5037 with another converter to increase or decrease the span of the temperature range.

Again referring to FIG. 1 and FIG. 2, one preferred embodiment maintains a "comfortable" temperature range for the interior of the vehicle over the time period the vehicle is parked and left unattended. A preferred "comfortable" temperature range is 20° to 25° C. That is, after activation, on the one hand, the windows and the sunroof are powered and moved to the CLOSED positions if the interior temperature drops below 20° as shown in steps 110,112. On the other hand, they are moved to pre-defined OPENED positions if the interior temperature exceeds 25° C. as shown in steps 114,116. As mentioned earlier, the windows are typically lowered to a position so that air ventilation may be effective in lowering the interior temperatures but not too low a position so that burglars may easily gain access to the car. In one case, limit switches in the systems 16,18 may be appropriately placed to allow a 10 millimeter opening in the OPENED position.

Unfortunately, even with the present invention activated, sometimes the temperature of the vehicle interior is exceedingly high or low so it may be life-threatening to those toddlers, pets or other incapacitated living beings left unattended in the vehicle. Steps 111 and 115 query whether the temperature measured by the sensor 14 is below or above the pre-determined danger thresholds, for example, 10° C. and 35° C. It is further foreseeable to have user-input threshold values via a control panel. Also, as shown by the example temperature values mentioned earlier, these threshold values do not have to be the same as those for the "comfortable" temperature range. Once life-threatening conditions are detected, an emergency communications system 21 executing step 113 is implemented to alert the vehicle driver or others concerning the dangerous conditions. Also, if the temperature is above 35° C., then it is preferred that among other things, the step 113 will cause the windows and the sunroof to move to the fully opened positions to increase air ventilation. However, if the temperature is below 10° C., then it is preferred that the step 113 before any other actions will first cause the windows and the sunroof to move to the fully closed positions.

The communications system 21 may include a vehicle alarm, a headlight flashing system and a vehicle emergency horn system. These devices may be used singly or in combination to alert the vehicle operator and/or others near by about the dangerous condition that exists for those who are left unattended in the vehicle. The communications system 21 further includes a typical pager device for activating in a well-known manner a beeper that is carried by the vehicle operator. Also, as vehicles are being increasingly equipped by Global Positioning System (GPS) location system, it can be used as a part of the communications system 21. Each vehicle may contact through its communications system 21 public emergency services, for example, police and paramedics, via telephone to indicate using digitized voice the necessary information such as the make of the vehicle, the thermal condition arid the location of the vehicle. A preferred embodiment with the emergency communications system 21 further includes a living being sensor. Such sensor may be implemented with a motion detector based on ultrasound, microwave, infrared or optical technologies. Once the vehicle operator is detected to be absent and that the present invention is active, the emergency communications system 21 remains inactivated unless the living being sensor indicates a presence of living being(s).

If the vehicle interior temperature falls within the "comfortable" temperature range, then the windows and the sunroof may be optionally be moved to either the OPENED or CLOSED positions. However, to actively maintain the temperature for the vehicle interior and to keep it within the "comfortable" range, a separate algorithm may be used. This algorithm is intended to provide finer control over the window and sunroof positions to better maintain those "comfortable" temperatures. Step 118,120 of FIG. 2 may include typical fuzzy logic electronics to control the window and sunroof positions for lengthening the duration of having "comfortable" temperatures in the vehicle interior. Also, the maintenance algorithm 120 may include setting the one or more vents to OPENED positions when the temperature falls within the upper half of the "comfortable" temperature range and to CLOSED positions when the temperature falls within the lower half of the range. The number of vents being OPENED or CLOSED may differ depending on where the temperature is relative to the range. Regardless, an important aspect of preferred embodiments is to actively maintain the vehicle interior temperature to be within the "comfortable" range for as long as possible.

Furthermore, vehicle interior temperature variability needs are different depending on geography. For example, the control routine 100 works well for vehicles in California. However, for vehicles in Alaska where the concern is primarily to prevent the vehicle interior to become too cold, steps 114,115,116 would then be unnecessary. In that case, the No line from step 110 would then go directly to step 118. Similarly, for vehicles in Colombia where the concern is just the opposite, then steps 110,111,112 would be unnecessary and that step 108 would then go directly to step 114. The "comfortable" temperature range, window and sunroof ventilation positions are preferably determined and fixed at the time of manufacture; however, it is within the contemplation of the present invention that these parameters may be customized by vehicle operators through a control panel located in the vehicle interior.

The foregoing description of preferred embodiments of the present invention have been presented for purposes of illustration and description. They are not intended to be exhaustive or to limit the invention to the precise forms disclosed, and obviously many modifications and variations are possible in light of the above teaching. It is intended that the scope of the invention be defined by the claims appended hereto and their equivalents.

We claim:

1. An automotive vehicle having a temperature-dependent system for intelligently controlling the temperature of a vehicle interior after the vehicle being left unattended by a vehicle operator, said temperature dependent system comprising:

a vehicle micro-controller located in the automotive vehicle and said vehicle micro-controller being operatively coupled to an activation and de-activation evaluator, a temperature sensing circuit, a communications system, a power window system and a power sunroof system, said micro-controller having access to a first pre-defined temperature range which having a first high value and a first low value and having access to a second pre-defined temperature range which having a second high value and a second low value;

the activation and de-activation evaluator including electronics to first detect the vehicle being parked and left unattended by a vehicle operator, said evaluator further informing the vehicle micro-controller in response to such first detection for activating said temperature-dependent system, said activation and de-activation evaluator further including electronics to second detect the vehicle operator returning to drive the vehicle away, said evaluator further informing the vehicle micro-controller in response to such second detection for de-activating said temperature-dependent system;

the temperature sensing circuit located in the vehicle for providing a temperature reading of the vehicle interior in response to an access by the vehicle micro-controller;

the vehicle micro-controller being responsive to the temperature reading being in between the first high value and the first low value by directing the power window and power sunroof systems to maintain the temperature reading to be within the first temperature range for as long as possible; and the vehicle micro-controller causing the communications systems to alert the vehicle operator if the temperature reading being above the second high value or below the second low value, the vehicle micro-controller further causing the power window and the power sunroof systems to move to CLOSED positions if the temperature reading being below the first low value of the first temperature range, the micro-controller causing the power window and the power sunroof systems to move to pre-defined OPENED positions if the temperature reading being above the first high value of the first temperature range.

2. The temperature-dependent system as claimed in claim 1 wherein the evaluator for the first detection of the vehicle being parked and left unattended by the vehicle operator requires for system activation an ignition key removed signal, a driver door OPENED signal and a subsequent driver door CLOSED signal.

3. The temperature-dependent system as claimed in claim 1 wherein the evaluator for the second detection of the vehicle operator returning to drive the vehicle away requires for system de-activation a driver door OPENED signal, a driver door CLOSED signal and a subsequent ignition switch ON signal.

4. The temperature-dependent system as claimed in claim 1 wherein the communications system including a pager electronics configured for signaling a beeper being carried by the vehicle operator.

5. The temperature-dependent system as claimed in claim 1 wherein the vehicle micro-controller in response to the temperature reading being in between the first high value and the first low value by directing the power window and power sunroof systems to move to the CLOSED positions if the temperature reading being in the lower half of the first pre-defined temperature range and to move to the OPENED positions if the temperature reading being in the upper half of the first pre-defined temperature range.

6. An automotive vehicle having a temperature-dependent system for intelligently controlling the temperature of a vehicle interior after the vehicle being left unattended by a vehicle operator, said temperature-dependent system comprising:

a vehicle micro-controller located in the automotive vehicle and said vehicle micro-controller being operatively coupled to an activation and de-activation evaluator, a temperature sensing circuit, a communications system, a power window system and a power sunroof system, said micro-controller having access to a first pre-defined temperature range which having a first high value and a first low value and having access to a second pre-defined temperature range which having a second high value and a second low value;

the activation and de-activation evaluator including electronics to first detect the vehicle being parked and left unattended by a vehicle operator, said evaluator further informing the vehicle micro-controller in response to such first detection for activating said temperature-dependent system, said activation and de-activation evaluator further including electronics to second detect the vehicle operator returning to drive the vehicle away, said evaluator further informing the vehicle micro-controller in response to such second detection for de-activating said temperature-dependent system;

the temperature sensing circuit located in the vehicle for providing a temperature reading of the vehicle interior in response to an access by the vehicle micro-controller;

the vehicle micro-controller causing the communications systems to alert the vehicle operator if the temperature reading being above the second high value or below the second low value, the vehicle micro-controller further causing the power window and the power sunroof systems to move to CLOSED positions if the temperature reading being below the first low value of the first temperature range, the micro-controller causing the power window and the power sunroof systems to move to pre-defined OPENED positions if the temperature reading being above the first high value of the first temperature range.

7. The temperature-dependent system as claimed in claim 6 wherein the first high value and the second high value being the same and wherein the first low value and the second low value being the same.

8. The temperature-dependent system as claimed in claim 6 wherein the communications system including a pager electronics configured for signaling a beeper being carried by the vehicle operator.

9. The temperature-dependent system as claimed in claim 6 wherein the communications system including a vehicle alarm and a headlight flashing system.

10. The temperature-dependent system as claimed in claim 6 wherein the communications system including a GPS system for obtaining vehicle location information and a telephone system for automatically dialing a pre-determined number to convey digitized information.

11. The temperature-dependent system as claimed in claim 6 wherein the communications system including a living being sensor, said communications systems being responsively inactivated for alerting the vehicle operator if the living being sensor not detecting any presence of living being inside the vehicle interior.

12. The temperature-dependent system as claimed in claim 6 wherein the vehicle micro-controller being responsive to the temperature reading being in between the first high value and the first low value by directing the power window and power sunroof systems to maintain the temperature reading to be within the first pre-defined temperature range for as long as possible.

13. The temperature-dependent system as claimed in claim 12 wherein the vehicle micro-controller in response to the temperature reading being in between the first high value and the first low value by directing the power window and power sunroof systems to move to the CLOSED positions if the temperature reading being in the lower half of the first pre-defined temperature range and to move to the OPENED positions if the temperature reading being in the upper half of the first pre-defined temperature range.

14. The temperature-dependent system as claimed in claim 12 wherein the vehicle micro-controller in response to the temperature reading being in between the first high value and the first low value by directing the power window and power sunroof systems to move in accordance with fuzzy logic electronics.

15. The temperature-dependent system as claimed in claim 6 wherein the evaluator for system de-activation includes a manual de-activation switch to be operated by the vehicle operator.

16. The temperature-dependent system as claimed in claim 6 wherein the first high value of the first temperature range is 25° C., and the first low value of the first temperature range is 20° C.

17. The temperature-dependent system as claimed in claim 6 wherein the second high value of the second temperature range is 35° C., and the second low value of the second temperature range is 10° C.

18. The temperature-dependent system as claimed in claim 6 wherein the first and second pre-defined temperature ranges may be adjusted by the vehicle operator using a control panel located in the vehicle interior.

19. A method for intelligently controlling the temperature of a vehicle after the vehicle being left unattended by a vehicle operator, the method comprising the steps of:

coupling a vehicle micro-controller to an activation and de-activation evaluator, a temperature sensing circuit, a communications system, a power window system and a power sunroof system, said micro-controller being located in the automotive vehicle and having access a first pre-defined high value and a second pre-defined high value;

detecting first by the activation and de-activation evaluator the vehicle being parked and left unattended by a vehicle operator, the first detecting step further including informing the vehicle micro-controller for activating said temperature-dependent system;

detecting second by the activation and de-activation evaluator the vehicle operator returning to drive the vehicle away, the second detecting step further including informing the vehicle micro-controller for de-activating said temperature-dependent system;

providing by a temperature sensing circuit a temperature reading of the vehicle interior in response to an access by the vehicle micro-controller; and alerting the vehicle operator using the communications system if the temperature reading being above the second high value; and causing the power window system to move to pre-defined OPENED positions if the temperature reading being above the first high value of the first temperature range.

20. The method for intelligently controlling the temperature of a vehicle after the vehicle being left unattended by a vehicle operator as claimed in claim 19, said method comprising:

said coupling step further including the vehicle micro-controller having access to a first pre-defined temperature range as defined by the first high value and a first low value and having access to a second pre-defined temperature range as defined by the second high value and a second low value, said second high value being higher than the first high value and said second low value being lower than the first low value;

directing the power window system in response to the temperature reading being in between the first high value and the first low value to maintain the temperature reading to be within the first pre-defined temperature range for as long as possible;

said alerting the vehicle operator step further including activating the communications system if the temperature reading being below the second low value; and said causing step further including causing the power window system to move to pre-defined CLOSED positions if the temperature reading being below the first low value of the first temperature range.

* * * * *